Patented Nov. 19, 1929

1,735,961

UNITED STATES PATENT OFFICE

HENRY DREYFUS, OF LONDON, ENGLAND

DYEING OF MATERIALS MADE OF OR CONTAINING CELLULOSE DERIVATIVES

No Drawing. Application filed March 12, 1927, Serial No. 175,013, and in Great Britain December 14, 1926.

This invention relates to the dyeing, printing and stencilling of threads, yarns, knitted or woven fabrics or other products made of or containing cellulose acetate or other organic acid esters of cellulose, such for example as cellulose formate, propionate or butyrate, or the product obtained by the treatment of alkalised cellulose with p-toluene sulphochloride (e. g. the product known as "immunized cotton"), or made of or containing cellulose ethers, such as methyl, ethyl or benzyl cellulose or the corresponding condensation products of cellulose and glycols or other polyhydric alcohols, all of which cellulose derivatives are hereinafter referred to as organic substitution derivatives of cellulose.

According to the present invention materials made of or containing one or more of the said organic substitution derivatives of cellulose are dyed or otherwise colored with polyhydroxyalkylamino-azo or polyhydroxyalkylimino-azo coloring matters or compounds or with substitution products thereof, that is to say with azo coloring matters or compounds containing one or more amino groups substituted by means of any aliphatic grouping containing two or more hydroxy groups. Further the invention includes the formation of such coloring matters on the fiber or material by combination of components, one or more of which contain such substituted amino groups.

Such compounds may readily be prepared, for example by interaction between an amino compound and halohydrin containing at least two hydroxy groups, such for example as glyceryl chlorhydrins, chlorbutylene glycol, erythritol dichlorhydrin, manitol mono- or dichlorhydrin and the like, or a carbohydrate such as glucose, lactose, galactose and the like or other aliphatic polyhydroxy aldehydes or ketones or an aliphatic polyhydroxy carboxylic acid, or by treatment of a halogen compound with an aliphatic polyhydroxy amine. The following examples of dyestuffs for use according to the present invention and of the methods of preparing them are intended to illustrate the invention and not to be in any way limitative.

*Example 1.*—p-Nitraniline is condensed with chlorbutylene glycol, the product reduced, diazotized and coupled with α-naphthylamine. The dyestuff obtained

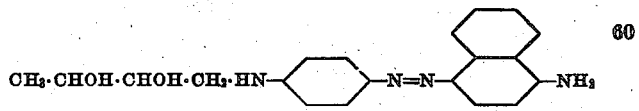

may be diazotized on the fibre and developed, for example with o-dihydroxy propylaminophenol (from glyceryl chlorhydrin and o-aminophenol).

*Example 2.*—Diazotized picramic acid is coupled with dihydroxypropylaniline. The dyestuff has the formula

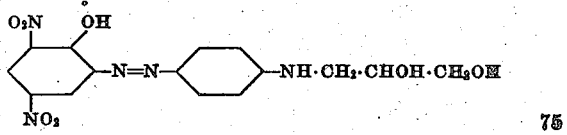

and can be used to dye cellulose acetate material in yellowish brown shades in the following manner:

20 grams of the dyestuff are dissolved as the ammonium salt in 2 litres of water, diluted to 30 litres, and 1 kilogram of previously wetted out cellulose acetate knit fabric is entered. Dyeing is commenced cold, and the dye bath raised to 75 to 80° C. during ¾ hour and maintained ¾ hour at 80° C. The fabric is then rinsed well and dried.

*Example 3.*—2.4 - dinitraniline is condensed with glyceryl chlorhydrin and the product partially reduced to produce 2-amino-4-nitrodihydroxypropylaniline, which is then diazotized and coupled with p-xylidine. The dyestuff obtained

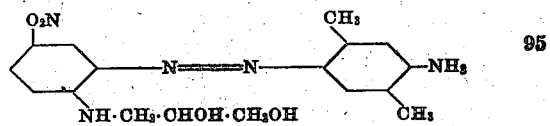

dyes cellulose acetate artificial silk in very fast shades.

The dyestuffs to be applied according to the present invention are in general sufficiently soluble to admit of their being applied in aqueous solution. Protective colloids or other auxiliaries may be added to the dyebaths. In some cases the dyestuffs, though soluble in water do not give the full shades desired and in such cases they may be pretreated with solubilizing agents, for example those described in U. S. Patents 1,618,413 and 1,618,414 and U. S. application Serial No. 50,525 and in the British Patents Nos. 273,819 and 273,820 and/or the corresponding U. S. applications Serial Nos. 134,138 and 176,289; viz bodies of oily or fatty characteristics, namely higher fatty acids or sulphonated or other derivatives thereof containing salt-forming groups, such as sulphoricinoleic acid or other sulphonated fatty acids or salts of such acids or bodies, for instance their alkali or ammonium salts, used alone or in conjunction with auxiliary solvents as described in U. S. Patent No. 1,690,481 and application Serial No. 152,517; carbocyclic compounds containing in their structure one or more salt-forming groups or salts of such compounds; sulpho-aromatic fatty acids or salts thereof; and soluble resin soaps or sodium or other soluble salts or soaps of resin acids.

Though in the above description monoazo dyestuffs alone have been referred to and, further, aliphatic side chains containing hydroxy groups only have been described it is to be understood that the invention extends to the use of polyazo dyestuffs and to the use of dyestuffs or compounds containing aliphatic side chains which, in addition to two or more hydroxy groups, may contain any other desired substitutes.

The invention further comprises the dyeing or otherwise coloring of mixed goods comprising for example, in addition to one or more of the organic substitution derivatives of cellulose, silk, wool or cellulose fibres natural or artificial such as cotton or the cellulose type of artificial silk, in solid or contrasting shades according to the affinity of the non-ester and non-ether portion of the goods. The goods may further be dyed with other dyestuffs for the non-ester and non-ether portion thereof either before, after or together with the dyestuffs of the present invention.

The term dyeing in the claims is to be understood to include printing and stencilling.

What I claim and desire to secure by Letters Patent is:—

1. Process for dyeing material comprising an organic substitution derivative of cellulose, comprising dyeing the material with an azo coloring compound which comprises at least one amino group substituted by an aliphatic grouping comprising not less than two hydroxy groups.

2. Process for dyeing material comprising an organic substitution derivative of cellulose, comprising dyeing the material with an azo coloring compound which comprises at least one amino group substituted by a glyceryl residue.

3. Process for dyeing material comprising an organic substitution derivative of cellulose, comprising dyeing the material with an azo coloring compound by combination on the material itself of components at least one of which comprises at least one amino group substituted by an aliphatic grouping comprising not less than two hydroxy groups.

4. Process for dyeing material comprising an organic substitution derivative of cellulose, comprising dyeing the material with an azo coloring compound by combination on the material itself of components at least one of which comprises at least one amino group substituted by a glyceryl residue.

5. Process for dyeing material comprising cellulose acetate, comprising dyeing the material with an azo coloring compound which comprises at least one amino group substituted by an aliphatic grouping comprising not less than two hydroxy groups.

6. Process for dyeing material comprising cellulose acetate, comprising dyeing the material with an azo coloring compound which comprises at least one amino group substituted by a glyceryl residue.

7. Process for dyeing material comprising cellulose acetate, comprising dyeing the material with an azo coloring compound by combination on the material itself of components at least one of which comprises at least one amino group substituted by an aliphatic grouping comprising not less than two hydroxy groups.

8. Process for dyeing material comprising cellulose acetate, comprising dyeing the material with an azo coloring compound by combination on the material itself of components at least one of which comprises at least one amino group substituted by a glyceryl residue.

9. Material comprising an organic substitution derivative of cellulose, dyed with an azo coloring compound which comprises at least one amino group substituted by an aliphatic grouping comprising not less than two hydroxy groups.

10. Material comprising cellulose actete, dyed with an azo coloring compound which comprises at least one amino group substituted by an aliphatic grouping comprising not less than two hydroxy groups.

In testimony whereof I have hereunto subscribed my name.

HENRY DREYFUS.